United States Patent
Schrof et al.

[11] Patent Number: 5,949,532
[45] Date of Patent: Sep. 7, 1999

[54] METHOD AND APPARATUS FOR RAMAN CORRELATION SPECTROSCOPY

[75] Inventors: Wolfgang Schrof, Neuleiningen; Jürgen Klingler, Mutterstadt; Dieter Horn, Heidelberg, all of Germany

[73] Assignee: BASF Aktiengesellschaft, Ludwigshafen, Germany

[21] Appl. No.: 08/900,714

[22] Filed: Jul. 28, 1997

[30] Foreign Application Priority Data

Jul. 31, 1996 [DE] Germany .................... 196 30 956

[51] Int. Cl.$^6$ .................... G01J 3/44; G01N 21/64; G01N 21/65
[52] U.S. Cl. .................... 356/73; 356/301; 356/318; 250/458.1
[58] Field of Search .................... 356/72, 73, 318, 356/301; 250/458.1, 459.1, 461.1

[56] References Cited

U.S. PATENT DOCUMENTS

| | | | |
|---|---|---|---|
| 4,071,298 | 1/1978 | Falconer | 356/301 |
| 4,768,879 | 9/1988 | McLachlan et al. | 356/301 |

FOREIGN PATENT DOCUMENTS 44 29 239  2/1996  Germany .

OTHER PUBLICATIONS

*Phys. Rev. Lett.*, vol. 29, 1972, pp. 705–708.
*Phys. Scr.*, vol. 19, 1979, pp. 486–490.
*Topics in Florescence Specr.*, vol. 1, Plenum Press, pp. 337–410.
*Dynamic Light Scattering*, (contents) Wiley, 1976.
*Appl. Optics*, vol. 30, No. 4, pp. 459–167.
*J. Opt. Soc. Am. B*, vol. 12(2), 1995, pp. 281–286.
*Infrared and Raman Spectroscopy*, CVH Weinheim, 1995 (contents).
*Appl. Spectrosc.*, vol. 49, 1995, pp. 1411–1430.

Primary Examiner—F. L. Evans
Attorney, Agent, or Firm—Keil & Weinkauf

[57] ABSTRACT

A method and an apparatus for determining diffusion parameters, concentration, size or flow behavior of particles in a sample, exciting light of a light source being directed into the sample, Raman scattered light being collected from an observed volume of the sample and being passed on to a spectrograph where it is resolved into spectral lines, the intensity of at least one spectral line being measured at least 10 times per second by means of one photodetector each, and the measured intensity values for the respective spectral line being used, via a fluctuation analysis, preferably an autocorrelation or a frequency analysis, to calculate diffusion parameters, concentration, size or flow behavior of the particle to which the spectral line in question can be assigned. With this method, it is also possible for signals of different spectral lines or bands, or signals of Raman scattered light, quasi-elastically scattered light and fluorescence light to be correlated with one another.

12 Claims, 4 Drawing Sheets

METHOD AND APPARATUS FOR RAMAN CORRELATION SPECTROSCOPY

The present invention relates to a method and an apparatus for Raman spectroscopy. This novel method enables the determination of diffusion parameters, concentration, size and flow behavior of particles in a sample in a particularly simple manner. In particular, a novel method and a corresponding apparatus for correlation spectroscopy is provided. This method can be described as Raman correlation spectroscopy.

Various methods are known for determining the diffusion behavior of particles such as molecules, aggregates or even relatively large particles. The simplest methods for determining the diffusion of particles envisage microscopic observations, the particles being tagged, for example, with a dye. These are unsuitable, however, for observing particles down in the size range of molecules. Fluorescence correlation spectroscopy methods, on the other hand, as described, for example, in DE-A-44 29 239, can be used to determine the diffusion behavior even of very small particles, within the molecular size range. This method involves the particles to be observed being tagged with a fluorescent dye, if they are not fluorescent themselves. Then the sample is irradiated with exciting light and the fluorescence light of the particles is detected. From the change over time of the intensity of a particular fluorescence wavelength, the diffusion parameters such as the diffusion rate or the diffusion coefficient can be inferred, for example by establishing an autocorrelation function or with the aid of a frequency analysis. It is also possible, however to determine the particle size of the fluorescent particles. The advantage of this method is the high selectivity of the observation, since only signals of fluorescent, i.e. as a rule specially stained particles are collected and analyzed. Fluorescence correlation spectroscopy has the drawback, however, that it is limited to particles which fluoresce or can be tagged with a fluorescent dye. Consequently the observation of the diffusion characteristics or the local concentration of very small particles in the molecular size range is not possible directly. Furthermore, non-fluorescent particles cannot be observed without major preparation, which often considerably limits the use of this technology, for example in the context of environmental protection, for example if measurements have to be carried out in the field, i.e. not under laboratory conditions.

The fluorescence correlation spectroscopy methods are explained in D. Madge, E. L. Elson, W. W. Webb, Phys. Rev. Lett. 29 (1972), 705–708; R. Riegler, P. Grasselli, M. Ehrenberg, Phys. Scr. 19 (1979), 486–490; and N. L. Thompson, "Topics in Fluorescence Spectroscopy, Vol. 1" (J. R. Lakowicz, Ed.), Plenum Press, New York, 1991, 337–410. Correlation-spectroscopy methods are set forth in general terms in B. J. Berne, R. Pecora, "Dynamic Light Scattering", Wiley, 1976.

Another method for studying the diffusion behavior, the size, the concentration or the flow behavior of particles is photon correlation spectroscopy which involves, similarly to fluorescence correlation spectroscopy, a sample being irradiated with exciting light and quasi-elastically scattered light being collected from the sample and being analyzed via fluctuation analysis. An advantage of this method is that it does not require tagging of particles, since each particle also scatters light quasi-elastically. This, however, at the same time constitutes the weakness of the method, since the selectivity of the observation is considerably reduced as a result.

For the purpose of analyzing the composition of a sample, on the other hand, Raman spectroscopy methods are known, as described, for example, in B. Schrader, "Infrared and Raman Spectroscopy", VCH Weinheim, 1995; L. Markwort, B. Kip, E. Da Silva, B. Roussel, "Resonance structures in elastic and Raman scattering from microspheres", Appl. Spectrosc. 49 (1995) 1411–1430; Chak K. Chan, Richard C. Flagan, John H. Seinfeld, "Enhancement of the Raman spectrum of optically levitated microspheres by seeded nanoparticles", Appl. Opt. (Feb. 1st 1991) v. 30(4), p. 459–467; T. Kaiser, G. Roll, G. Schweiger, J. Opt. Soc. Am. B (1995), 12(2), p. 281–286. These involve the determination of the chemical composition of a sample with the aid of measuring molecular vibrations and molecular rotations. In Raman spectroscopy, exciting light is transmitted into a sample and the spectral composition of the scattered light and the intensity of the individual spectral lines of the scattered light are analyzed. While Raman spectroscopy has a high selectivity, it does not provide any information on the diffusion behavior of particles.

It is therefore an object of the present invention to provide a method for determining diffusion parameters of particles, such as the diffusion rate and the diffusion constants, the local concentration, the size and the flow behavior of particles, which has good selectivity and does not require tagging of the particles to be observed. A further object of the present invention is to provide a corresponding apparatus.

We have found that this object is achieved a method for determining diffusion parameters, concentration, size and flow behavior of particles in a sample is provided, wherein exciting light of a light source is directed into the sample and scattered light from an observed volume of the sample is collected and passed to a spectrograph. There it is resolved into its spectral lines, and the intensity of at least one spectral line is measured at least 10 times per second by means of one photodetector per spectral line. On the basis of the measured intensity values measured for the spectral line in question the desired physical variables are then calculated. These may be diffusion parameters, the concentration or alternatively the size of particles to which the spectral lines in question can be assigned.

Equally, however, information on the flow behavior of particles can be obtained, if the observed volume of the sample is subjected to an appropriate flow. The calculation is performed in one or more analyzers whose construction is essentially known from fluorescence correlation spectroscopy. It involves the time-dependent intensity being subjected to fluctuation analysis, which means that a suitable computational model is used to analyze the intensity profile of a particular spectral line and thence to calculate the desired values. Such models are generally known in correlation spectroscopy. It is possible, for example, to establish the autocorrelation function of the intensity, as described in DE-A-44 29 239. Alternatively, a frequency analysis can be employed, for example via a Fourier decomposition of the change of the intensity with time. Thus it is possible to obtain information not only on the type and the structure but also on the size and the diffusion behavior of the observed particles. The Raman correlation spectroscopy method according to the invention thus combines the selectivity of fluorescence correlation spectroscopy with the variable options of employing photon correlation spectroscopy, since on the one hand it is possible to observe the spectral lines of quite specific particles, and on the other hand tagging of these particles is unnecessary. Instead of a spectral line it is always possible in this context and in what follows for a spectral band, i.e. a number of closely spaced spectral lines, to be observed and analyzed.

In the method according to the invention the exciting light is provided by any light source, although this should be monochromatic if possible. Preferably, a laser is used. Via optics or with the aid of optical fibers the exciting light is then directed into the sample. This sample contains the particles to be observed. The observed particles may be molecules or aggregates or equally be larger particles. These particles may, for example, be suspended in a liquid but they may alternatively be present in another sample which does not excessively restrict the free movement of the particles. The exciting light is scattered inelastically by the particles in the sample, so that frequency-shifted scattered light emerges from the sample. This Raman scattered light is collected with the aid of an optical system or with the aid of optical fibers and passed to a spectrograph, preferably a grating spectrograph, which resolves the scattered light into the individual spectral lines. The intensity of these spectral lines is then analyzed as described above.

For fluctuations to be observable, i.e. for statements on the diffusion in a restricted observed region to be possible, the observed volume in the sample must be precisely defined and be of the correct size. The size of the observed volume is typically from 0.1 $\mu m^3$ up to 50,000 $\mu m^3$, the size of the observed volume depending primarily on the particle size, but also on their concentration and other parameters. The sample volume is defined either via confocal optics in the beam path of the exciting light and an aperture in the beam path of the scattered light or by other useful measures, for example the use of optical fibers, in particular of waveguides. If confocal optics are used, as described in T. Wilson, C. Sheppard, "Theory and Practice of Scanning Optical Microscopy", Academic Press, New York, 1984, and T. Wilson (Ed.), "Confocal Microscopy", Academic Press, London (1984), the exciting light beam is focused at a point in or near the sample, so that the observed volume is defined, in terms of its cross section, by the edge of the excitation light cone thus defined. The depth of the volume from which scattered light is analyzed is a function, with this solution, of the size and position of the aperture in the beam path of the scattered light, the reason being that scattered light coming from layers higher up or lower down in the sample is simply filtered out. If optical fibers are used as previously described in DE-A-44 29 329 for fluorescence correlation spectroscopy, the observed volume can be defined by a single optical fiber which is immersed into the sample or is positioned on the outside of the transparent sample cell. The definition of the sample volume in this case is based on the fact that light at the optical fiber spout, which has a very small cross section, is virtually unable to emerge into the sample in any direction other than the axial direction of the optical fiber end. The observed volume in the axial direction is then delimited by the decrease in intensity of the Raman scattered light backscattered into the optical fiber according to the fourth power of the distance of the scattering particle from the end of the optical fiber. Another possibility for defining the observed volume consists in two optical fibers, one for emitting the exciting light and one for collecting the scattered light, being arranged at an angle with respect to one another, so that the intersection volume of the light emission cone and the light collection cone define the observed volume.

The frequency of the intensity measurement of the spectral line in question depends on the required temporal resolution of the measurement. For any statements on the diffusion of particles to be possible, however, the intensity of the spectral line of interest should be determined at least ten times per second. Useful for this temporal resolution are photodetectors which respond rapidly and have a low relaxation time, such as, for example, suitable photomultipliers or photodiodes. From the intensities determined the autocorrelation function can then be calculated or the Fourier decomposition or some other suitable analytical procedure can be performed.

If a laser or some other monochromatic light source is used as the exciting light, it is advantageous for a notch filter to be incorporated in the beam path of the scattered light, to separate reflected exciting light which has not been frequency-shifted from the scattered light and thus to facilitate subsequent spectral analysis. The notch filter may also be used for deviating the incident exciting light beam, since precisely this particular wavelength is reflected to a very high degree and is hardly at all transmitted by the filter.

If a laser is used, it is also advantageous for it to be used in pulsed mode, i.e. noncontinuously. This is because any fluorescence emission of sample particles, which is excited by the laser light and is superimposed on the scattered light will respond with some delay to the incoming light, whereas the onset of scattering is immediate, i.e. with a negligible response time. If a pulsed light source is used, therefore, the scattered light can be measured during the pulse, and the fluorescence light which arrives later can be filtered out temporally by selecting an appropriate time window for analysis.

Within the scope of the invention preference is given to a method wherein the intensity of at least two different spectral lines of Raman scattering is measured and wherein the correlation of the diffusion behavior of those particles is determined to which the spectral lines in question are assigned. To this end, the individual signals are preferably correlated with one another with the aid of a cross-correlation function. Other suitable correlation methods can also be used, however. Thus it is possible to state whether the fluctuations of a plurality of particle types take place in a correlated, i.e. synchronized manner. Hence it is possible to infer, for example, that certain molecules are linked to one another or are located on a particular support. In principle, any number of spectral lines can be observed and analyzed in this context. In that case, an observation channel or even a separate photodetector is then provided for each spectral line.

Within the scope of the invention a further method is also provided which involves recording and analyzing not only the Raman scattered light but also fluorescence light or quasi-elastically scattered exciting light from the observed volume of the sample. In so doing, the Raman scattered light is excited, detected and analyzed as described above. In addition, as mentioned above, fluorescence light is always generated if the sample contains fluorescent particles. If it does not, the sample particles may be stained with suitable fluorescent dyes. Quasi-elastically scattered light is also always generated in addition to the inelastically scattered light resulting in the Raman effect. Detection of the fluorescence light and of the quasi-elastically scattered light can take place in the same beam path in which the Raman scattered light is also diverted from the sample. Prior to impinging on the spectrograph, these additional components must then either be diverted by means of suitable measures and be analyzed separately or must be analyzed together with a Raman scattered light. In so doing, the intensity of the fluorescence light and of the quasi-elastically scattered light can be used to carry out a fluctuation analysis as described above, i.e. for example an autocorrelation or a frequency analysis, which provides information on the various parameters which can be determined in the context of fluorescence or photon correlation spectroscopy. Particularly interesting observations are possible, however, if the signals due to Raman scattering, to quasi-elastic scattering and fluorescence are correlated with one another, e.g. employing a cross-correlation function, the reason being that it is then possible to determine which particles are linked to one another or typically behave similarly or even entirely differently.

A further advantageous embodiment of the method according to the invention results if the wavelength of the exciting light is selected so as to be close to an absorption frequency of a particle type observed, since the scattered light is thereby enhanced by the resonance Raman effect. If this effect is to be utilized, the light source must, however, be specially selected for the particle type observed. Moreover it is advantageous for the exciting light or the scattered light to be enhanced by resonance in a container which contains the light source and/or the sample. Examples of these are Fabry-Perot resonators or micromechanically fabricated mirrored containers whose dimensions are such that the conditions for resonance enhancement of the exciting light or of the Raman scattered light are met.

According to the invention, an apparatus which is useful for implementing one of the above-described methods and is designed for determining diffusion parameters, concentration, size or flow behavior of particles in a sample is provided, which comprises at least the following elements: a light source, preferably a laser, for generating exciting light, first optics, which are linked to the light source and are designed for introducing the exciting light into the sample, second optics which are linked to the sample and are designed for collecting Raman scattered light and passing it on from an observed volume of the sample, a spectrograph, preferably a grating spectrograph, which is linked to the second optics and is designed for the spectral resolution of the Raman scattered light from the sample, third optics for passing the spectral fractions of the scattered light onto at least one photodetector, and at least one analyzer unit for calculating diffusion parameters, concentration, size or flow behavior of particles in the sample via a fluctuation analysis, as described above. If appropriate, a cross-correlation of a plurality of spectral lines is established. The explanatory notes provided above with respect to the individual elements or procedural steps apply accordingly.

Preferred is an apparatus according to the invention in which the first and/or the second optics comprise fiber optics for introducing the exciting light into the sample and/or for collecting the light from the observed volume of the sample.

The invention is described below with reference to the drawings, in which.

Figures 1A, 1B:
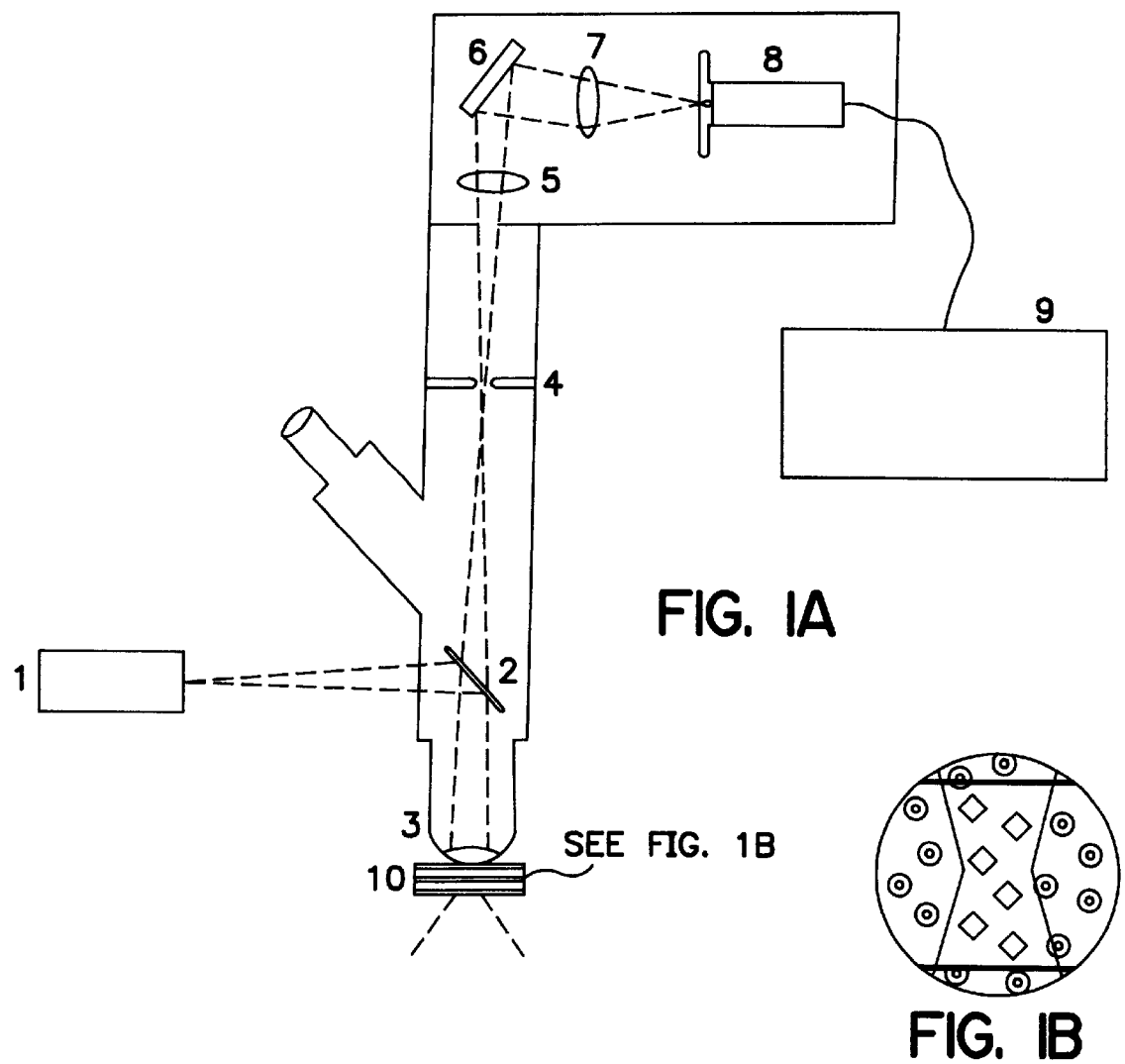
FIG. 1 shows a schematic configuration of an apparatus for applying Raman correlation spectroscopy according to the invention involving analysis of one spectral line or spectral band.

FIG. 1 shows an apparatus according to the invention for implementing the Raman correlation spectroscopy method according to the invention. The apparatus is essentially based on a combination of a confocal microscope with a laser light source and a Raman spectrometer. The exciting light of a laser light source 1 is deviated herein by a notch filter 2, so that it passes, via a lens 3, into the sample 10 which contains the particles to be studied. The notch filter is particularly suitable for deviation, because it almost totally reflects the specific laser wavelength. Conventional mirror arrangements may also be used, however. The lens 3 defines the cross section of the observed volume in the sample 10, since it focuses the exciting light of the laser 1 and the light cone formed delimits the propagation of the laser light in the sample perpendicular to the direction of incidence. The laser light scattered inelastically in the sample 10 is collected from the sample by a lens 3 and via the notch filter 2, which in the process filters out exciting light reflected from the sample 10, is transmitted onward to an aperture 4. By virtue of its masking effect this aperture 4 defines the depth of the observed volume in the sample 10, i.e. the extent of this volume in the direction of incidence of the exciting light. Downstream of the aperture 4, the Raman scattered light passes via lens 5 to reach a grating spectrograph 6 which disperses the scattered light. The individual spectral lines are then, via a further lens 7, passed to the photodetector 8 with whose aid the intensity of the spectral line is measured. In an analyzer unit 9 the change of the intensity, with time, of each spectral line is subjected to fluctuation analysis, i.e. for example, an autocorrelation function is established or a frequency analysis is performed. Examples of analyzer units which can be used for this purpose are hardware correlators, hardware frequency analyzers and standard computers equipped with suitable software. With the aid of these functions it is then possible for diffusion parameters, concentration, size and flow behavior of individual particles to be determined.

Figure 2A:
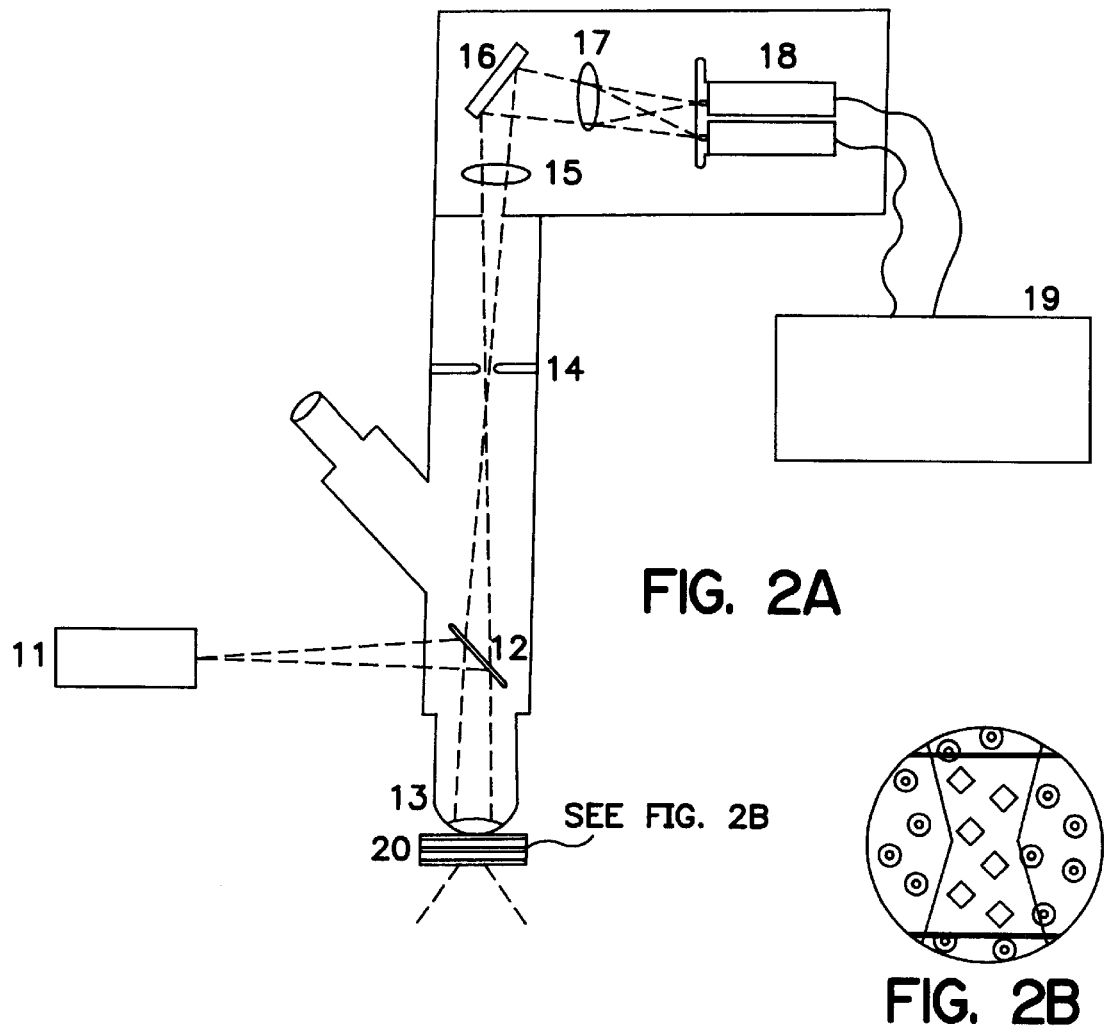
FIG. 2 shows a schematic configuration of an apparatus for applying Raman correlation spectroscopy according to the invention involving analysis of a plurality of spectral lines or spectral bands.
Figure 2B:
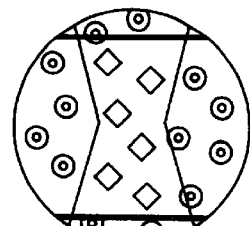

FIG. 2 depicts a preferred apparatus according to the invention, in which, as described above, the exciting light of a laser 11 is passed into a sample 20 via a notch filter 12 and a lens 13. The Raman scattered light is then, via a lens 13, notch filter 12, an aperture 14 and a lens 15, passed to a grating spectrograph 16, whence spectral fractions of the Raman scattered light are passed, via a lens 17, to the two photodetectors 18. Each photodetector here is allocated to one spectral line or alternatively to a spectral band, i.e. a series of spectral lines. In the process, the intensity of the spectral lines is first determined separately in analyzer unit 19 and is then cross-correlated, so that appropriate inferences are possible with respect to the correlation of the diffusion behavior of different particles. Instead of two detectors it is also possible for a plurality of photodetectors to be fitted, so that the diffusion behavior of a plurality of particle types can be observed simultaneously.

Figures 3A, 3B:
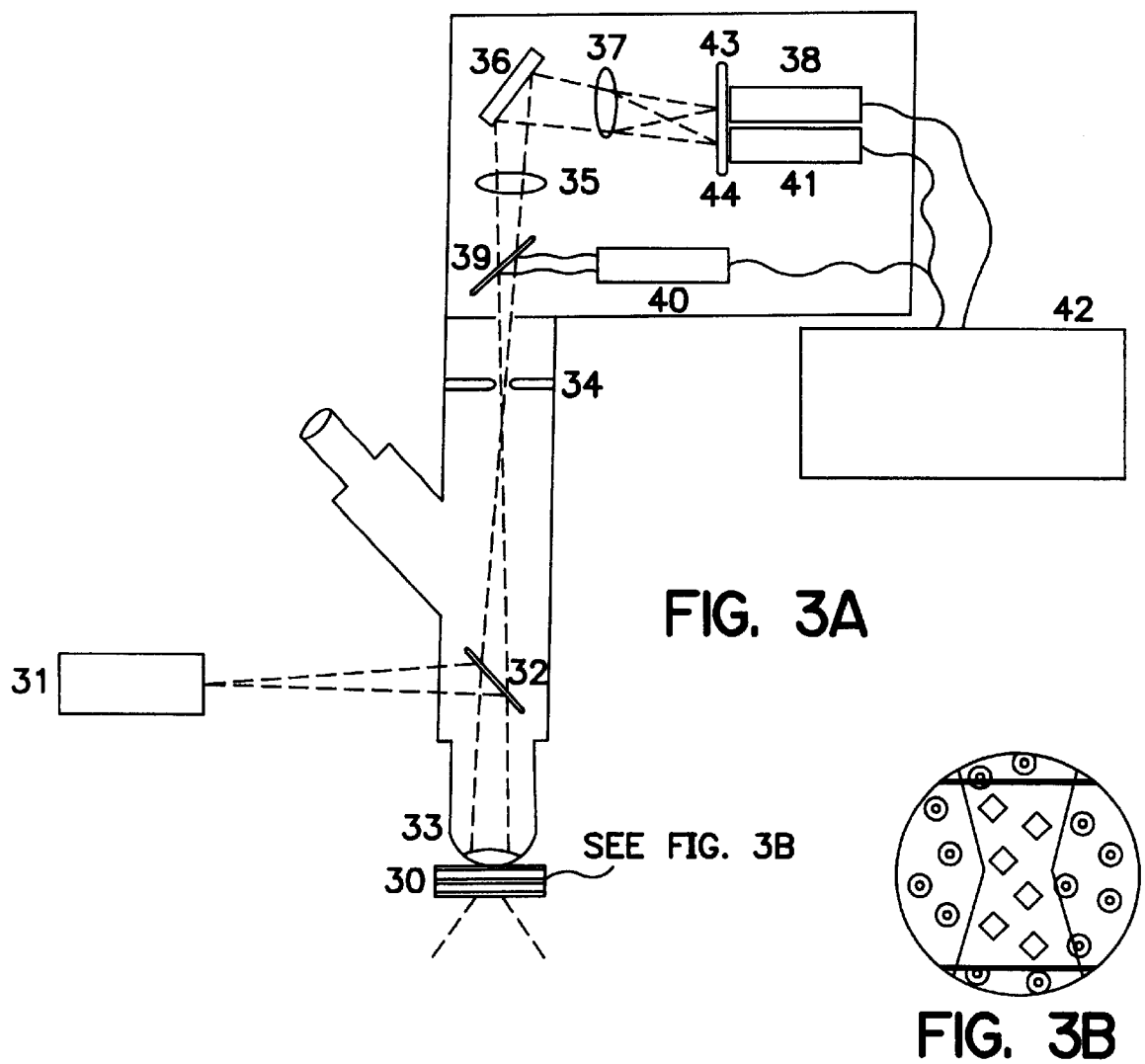
FIG. 3 shows a schematic configuration of an apparatus for applying Raman correlation spectroscopy according to the invention involving analysis of the Raman scattered light and fluorescence light.

FIG. 3 shows an arrangement for the simultaneous analysis of Raman scattered light and fluorescence light. In this arrangement, exciting light of a laser 31 is directed onto a notch filter 32 which reflects the exciting light onto a lens 33. The lens 33 focuses the exciting light beam into sample 30. Light reflected from the sample volume is directed, via lens 33, notch filter 32 and aperture 34, onto a dichroic filter 39. The filter 39 serves for filtering out fluorescence light from the sample onto the additional detector 40. The Raman scattered light is directed, via filter 39 and a lens 35, onto a spectrograph 36 which deviates the Raman scattered light via a lens 37 and apertures 43 and 44 onto detectors 38 and 41. All the detectors 31, 41 and 40 are connected to an analyzer unit 42. Preferably, a cross-correlation between a signal from detector 38 or 41 and the signal from detector 40 is calculated there. Thus both the information resulting from the behavior of the fluorescent particles and the information resulting from the analysis of the Raman scattered light can be combined with one another. The dichroic filter 39 and the additional detector 40 may also be omitted, however. In that case the fluorescence light, together with the Raman scattered light, is passed to the grating spectrograph 36 which separates these fractions on the basis of their different frequencies. The separated fractions can then be analyzed in the detectors 38 and 41 as if they were simply different wavelengths of the Raman scattered light.

Figure 4A:
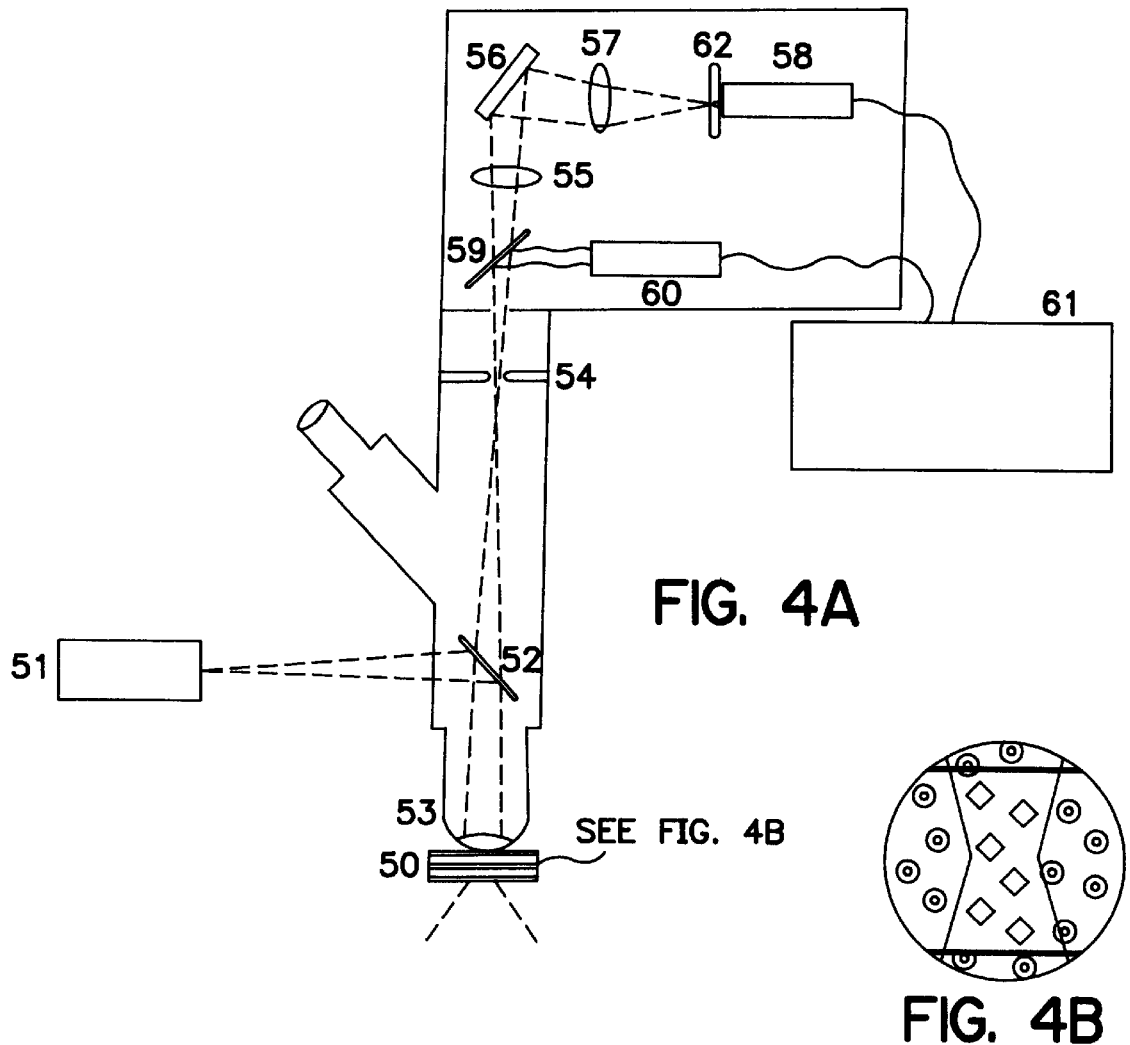
FIG. 4 shows a schematic configuration of an apparatus for applying Raman correlation spectroscopy according to the invention involving analysis of the Raman scattered light and quasi-elastically scattered light.
Figure 4B:
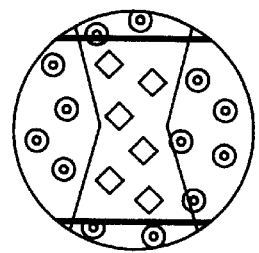

FIG. 4 shows a further arrangement according to the invention, which differs from the arrangement depicted in FIG. 1 by a further notch filter 59 being positioned between aperture 54 and lens 55 and by an additional detector 60. With the aid of this further notch filter 59, quasi-elastically scattered light may be deviated from the sample 50 onto the additional detector 60 which, like detector 58 for the Raman scattered light, is connected to an analyzer unit 61. In this analyzer unit 61, the signal of the Raman scattered light from detector 58 is preferentially cross-correlated with the signal of the quasi-elastically scattered light from detector 60. Here, again, specific conclusions are possible with respect to the particle correlation. In this arrangement, the first notch filter 52 may alternatively be replaced by a dichroic mirror, so that the signal of the quasi-elastically scattered light will not become too weak.

Of course, the two methods described in FIGS. 3 and 4 can also be combined with one another. It is then possible to use the same method or the same measuring apparatus to measure and analyze fractions of both Raman scattered light and of quasi-elastically scattered light or fluorescence light. In so doing, in principle any signal can be correlated with any other signal.

The fields of application of the invention include, inter alia, medicine, the protection of the environment and general analytical chemistry. The method according to the invention can be employed, in particular, to monitor the reactions in a particle or between particles, or particle growth processes or the precipitation of substances onto particles. Examples include monitoring of particle growth and polymerization in the case of emulsion polymerization processes, analysis and monitoring of the preparation of mixtures of particles of different sizes or compositions, analysis and monitoring of the preparation of coated particles, for example in precipitation processes, and analysis and monitoring of the preparation of pigments coated with binders. Further examples are analysis and monitoring of the preparation of particle mixtures in terms of particle type and particle size, monitoring the change in the morphology and size of pigments, the change in the morphology being observable via analysis of the Raman shift and the size of the particles being determinable with the aid of Raman correlation spectroscopy according to the invention. With the aid of this method according to the invention it is also possible for catalytic processes, swelling processes, flocculation processes and surface coatings to be monitored and controlled in situ. In biology, for example, application fields comprise screening of active substances and the analysis of the bioavailability of particles. Analytical applications exist, for example, in gas bubble analytics.

We claim:

1. An apparatus for determining diffusion parameters, concentration, size or flow behavior of particles in a sample, which comprises at least the following elements:

a laser light source (11, 31, 51) for emitting exciting light, a lens (13, 33, 53) for collimating the exciting light and for introducing the exciting light into a sample (20, 30, 50) containing particles, a notch filter (12, 32, 52) which is disposed in such a way between the light source (11, 31, 51) and the lens (13, 33, 53) that the exciting light is reflected onto the lens (13, 33, 53), the notch filter (12, 32, 52) and the lens (13, 33, 53) being arranged in such a way with respect to each other and to the sample (20, 30, 50) that Raman scattered light and, where appropriate, fluorescence light is directed from the sample (20, 30, 50) through the lens (13, 33, 53) and the notch filter (12, 32, 52), an aperture (14, 34, 54) and a lens (15, 35, 55) for onward transmission of the collected Raman scattered light and, if appropriate, fluorescence light from the notch filter (12, 32, 52), a spectrograph (16, 36, 56) for resolving the Raman scattered light and, where appropriate, fluorescence light which has been passed on by the lens (15, 35, 55), into spectral lines, a plurality of photodetectors (18, 38, 41) and a detector or one or more photodetectors (18, 38, 41, 58) and a detector (40, 60), by means of which the intensity of the Raman scattered light or fluorescence light of one spectral line at a time is determined at least 10 times per second, a lens (7, 37, 57) for onward transmission of at least one spectral line of the resolved Raman scattered light or fluorescence light to each of the photodetectors (18, 38, 41, 58), and an analyzer unit (19, 42, 61) for calculating diffusion parameters, concentration, size or flow behavior of particles in the sample via a fluctuation analysis of the intensity or, if at least two spectral lines or if Raman scattered light and fluorescence light are being observed, via a cross-correlation of the intensities of different spectral lines or the intensities of the Raman scattered light and the fluorescence light, respectively.

2. An apparatus as defined in claim 1, wherein between the aperture (34, 54) and the lens (35, 55) a dichroic filter (39) for filtering out fluorescence light and/or a further notch filter (59) for filtering out quasi-elastically scattered light from the beam path is disposed which deviates the fluorescence light and/or the quasi-elastically scattered light onto a detector (40, 60) which is connected to the analyzer unit (42, 61).

3. A method for determining diffusion parameters, concentration, size or flow behavior of particles in a sample, wherein exciting light of a light source is directed into the sample, Raman scattered light from an observed volume of the sample is collected and passed to a spectograph which resolves it into spectral lines, the intensity of at least one spectral line is measured at least 10 times per second by means of one photodetector each and on the basis of the intensity values measured for the spectral line in question diffusion parameters, concentration, size or flow behavior of the particles to which the spectral line in question can be assigned are calculated via a fluctuation analysis of the intensity values, wherein the intensity of at least two spectral lines is measured, on the basis of which, a cross-correlation function being established, the correction of the diffusion behavior of the particles is determined to which the spectral lines in question can be assigned.

4. The method of claim 3, wherein Raman scattered light from the sample is directed by a lens onto a notch filter, and the light transmitted by the notch filter is directed through an aperture and then to the spectrograph.

5. The method of claim 3, wherein the exciting light is introduced into the sample with the aid of fiber optics and/or the Raman scattered light is collected from the sample with the aid of fiber optics.

6. The method of claim 3, wherein the wavelength of the exciting light is selected so as to be close to an absorption frequency of a particle type present in the sample, so that the Raman scattered light is enhanced by resonance.

7. The method of claim 3, wherein the exciting light and/or the Raman scattered light is enhanced by resonance in a container which contains the light source and/or the sample.

8. The method of claim 3, wherein exciting light of a laser light source (11, 31, 51) is directed to a notch filter (12, 32, 52) and is reflected thereon onto a lens (13, 33, 53) which focuses the exciting light and directs it into a sample (20, 30, 50) containing particles, Raman scattered light from the sample (20, 30, 50) is collected by means of the lens (13, 33, 53) and is directed via notch filter (12, 32, 52), via an aperture (14, 34, 54) and via a lens (5, 15, 35, 55) onto a spectrograph (16, 36, 56) which resolves the Raman scattered light into spectral lines, the light of at least one spectral line is directed via a lens (17, 37, 57) directed to one photodetector (18, 38, 41, 58) each, by means of which the intensity of the spectral line is measured at least 10 times per second, and in an analyzer unit (19, 42, 61), by means of fluctuation analysis, of the intensity or, if at least two spectral lines are being observed, by means of a cross-correlation of the intensities of spectral lines, diffusion parameters, concentration, size or flow behavior of particles in the sample (20, 30, 50) are determined.

9. The method of claim 8, wherein light which has been collected from the sample (30) and in addition to Raman scattered light also contains fluorescence light, is directed to a dichroic filter (39) which is situated downstream of the aperture (34), filters the fluorescence light out from the beam path and passes it to a detector (40) which is connected to the analyzer unit (42), the signal of the Raman scattered light and the signal of the fluorescence light being cross-correlated in the analyzer unit (42).

10. The method of claim 8, wherein light which has been collected from the sample (30) and in addition to Raman scattered light also contains fluorescence light, is separated by a grating spectrograph (36) into a Raman scattered light fraction and a fluorescence light fraction, the fractions being passed separately by a lens (37) into the photodetectors (38, 41) and the signal of the Raman scattered light and the signal of the fluorescence light being cross-correlated in the analyzer unit (42).

11. The method of claim 8, wherein light which has been collected from the sample (50) and in addition to Raman scattered light also contains quasi-elastically scattered light, is directed to a further notch filter (59) which is situated downstream of the aperture (54), filters quasi-elastically scattered light out from the beam path and passes it to a detector (60) which is connected to the analyzer unit (61), the signal of the Raman scattered light and the signal of the quasi-elastically scattered light being cross-correlated in the analyzer unit (61).

12. A method for determining diffusion parameters, concentration, size or flow behavior of particles in a sample, wherein exciting light of a light source is directed into the sample, Raman scattered light from an observed volume of the sample is collected and passed to a spectograph which resolves it into spectral lines, the intensity of at least one spectral line is measured at least 10 times per second by means of one photodetector each and on the basis of the intensity values measured for the spectral line in question diffusion parameters, concentration, size or flow behavior of the particles to which the spectral line in question can be assigned are calculated via a fluctuation analysis of the intensity values, in addition to the Raman scattered light, reflected fluorescence light or quasi-elastically scattered exciting light is collected from the sample and a signal of the Raman scattered light is cross-correlated with a signal of the reflected fluorescence light or with a signal of the quasi-elastically scattered exciting light.

* * * * *